United States Patent
Takahashi

(10) Patent No.: US 9,611,917 B2
(45) Date of Patent: Apr. 4, 2017

(54) TRANSMISSION

(71) Applicant: SUZUKI MOTOR CORPORATION, Shizuoka-Ken (JP)

(72) Inventor: Hideaki Takahashi, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 128 days.

(21) Appl. No.: 14/571,437

(22) Filed: Dec. 16, 2014

(65) Prior Publication Data
US 2015/0176683 A1    Jun. 25, 2015

(30) Foreign Application Priority Data
Dec. 20, 2013   (JP) .................................. 2013-263916

(51) Int. Cl.
| F16H 3/08 | (2006.01) |
| F16H 59/00 | (2006.01) |
| F16H 3/091 | (2006.01) |
| F16D 11/14 | (2006.01) |
| F16H 3/089 | (2006.01) |
| F16D 11/10 | (2006.01) |
| F16D 21/04 | (2006.01) |

(52) U.S. Cl.
CPC ............ *F16H 3/091* (2013.01); *F16D 11/10* (2013.01); *F16D 11/14* (2013.01); *F16D 21/04* (2013.01); *F16H 3/089* (2013.01); *F16H 2003/0811* (2013.01); *Y10T 74/19279* (2015.01)

(58) Field of Classification Search
CPC ............. F16H 3/006; F16H 3/02; F16H 59/02
USPC ................................. 74/325, 337.5
See application file for complete search history.

(56) References Cited

U.S. PATENT DOCUMENTS

| 5,603,242 A * | 2/1997 | Krieger | ................... F16H 3/006 74/335 |
| 6,095,001 A * | 8/2000 | Ruehle | .................... F16H 3/006 74/331 |
| 6,318,501 B1 * | 11/2001 | Udou | ................. F16H 57/0426 184/6.12 |

(Continued)

FOREIGN PATENT DOCUMENTS

| CN | 101981356 A | 2/2011 |
| CN | 202017735 U | 10/2011 |

(Continued)

OTHER PUBLICATIONS

Chinese Office Action in corresponding application 201410831233.6, Aug. 11, 2016.

*Primary Examiner* — Ha D Ho
(74) *Attorney, Agent, or Firm* — Barnes & Thornburg LLP

(57) ABSTRACT

A transmission for transmitting a motive power of an engine includes a counter shaft that receives a motive power from a crank shaft of an engine, a drive shaft that is connected to the crank shaft and configured to output the motive power, a multi-stage gear train that has a plurality of unit gear trains each having a drive gear and a driven gear, a plurality of jaw clutches each of which is movably provided between adjacent ones of the unit gear trains, a plurality of shift forks each of which is coupled to a corresponding one of the plurality of jaw clutches, and a shift cam that moves the plurality of jaw clutches via the plurality of shift forks to select one unit gear train in the multi-stage gear train that is to be used to transmit the motive power from the counter shaft to the drive shaft.

1 Claim, 5 Drawing Sheets

(56) References Cited

U.S. PATENT DOCUMENTS

| | | | | |
|---|---|---|---|---|
| 8,402,859 B2* | 3/2013 | Neelakantan | ........... | F16H 63/18 74/337.5 |
| 8,689,923 B2* | 4/2014 | Kishikawa | ............... | B62H 1/02 180/219 |
| 8,850,913 B2* | 10/2014 | Nikolaizig | ................ | F16H 3/08 74/325 |
| 2003/0181279 A1 | 9/2003 | Yamada | | |

FOREIGN PATENT DOCUMENTS

| | | |
|---|---|---|
| EP | 1 031 766 A2 | 8/2000 |
| JP | 2012250660 A | 12/2012 |

\* cited by examiner

TRANSMISSION

PRIORITY CLAIM

This patent application claims priority to Japanese Patent Application No. 2013-263916, filed 20 Dec. 2013, the disclosure of which is incorporated herein by reference in its entirety.

BACKGROUND OF THE INVENTION

Field of the Invention

The present invention relates to a transmission that transmits a motive power of an engine.

Description of the Related Art

A conventional transmission of an engine is provided with a first gear train, a fourth gear train, a third gear train, a sixth gear train, a fifth gear train and a second gear train arranged in this order from the side of a primary driven gear. On a drive shaft, jaw clutches are provided between a first driven gear and a fourth driven gear, between a third driven gear and a sixth driven gear, and between a fifth driven gear and a second driven gear. It is to be noted that the term "jaw (clutch)" used herein may be substituted with "dog (clutch)" in the same meaning.

Gear trains with lower gear ratios (closer to the first gear train) are subjected to higher tooth surface loads than gear trains with higher gear ratios (closer to the sixth gear train). Therefore, a counter shaft and the drive shaft that support the gear trains are subjected to higher loads at sections that support gear trains with lower gear ratios (closer to the first gear train) than sections that support gear trains with higher gear ratios (closer to the sixth gear train), for example, as described in Japanese Patent Laid-Open No. 2012-250660 (Patent Document 1).

With the conventional transmission mentioned above, the third gear train with a relatively low gear ratio is supported on center sections of the counter shaft and the drive shaft. Therefore, during a time of power (motive power) transmission by the third gear train, the counter shaft and the drive shaft are significantly deformed, which is unfavorable from the viewpoint of durability of the shafts.

As like as the tooth surface load on the gears, the load applied to the jaw clutches that transmits the motive power from the gear trains to the drive shaft are also higher at gear trains with lower gear ratios (closer to the first gear train) than at gear trains with higher gear ratios (closer to the sixth gear train). Therefore, jaw clutches that transmit the motive power from gear trains with lower gear ratios to the drive shaft have to have larger outer diameters.

In the conventional transmission, since the jaw clutches are disposed between the first gear train and the fourth gear trains, between the third gear train and the sixth gear train, and between the fifth gear train and the second gear train, and the gear ratio difference between the gear trains on both the sides of each jaw clutch is three steps, there is a corresponding (three-step) difference in outer diameter between the sides of each jaw clutch.

A fork groove into which a shift fork is to be fitted is formed in a center section of the jaw clutch. The fork groove needs to have a depth that provides a sufficient contact area between the jaw clutch and the shift fork at the side with the smaller outer diameter (on the side of the gear train with the higher gear ratio). This depth of the fork groove is the dimensional difference between the top of the side with the smaller outer diameter and the bottom of the fork groove.

However, at the side with the larger outer diameter (on the side of the gear train with the lower gear ratio), the dimensional difference between the top of the side of the fork groove and the bottom of the fork groove is larger than the dimensional difference on the side of the gear train with the lower gear ratio, or in other words, the fork groove has a larger depth. Therefore, the thickness of the section of the jaw clutch that supports the protruding jaw at the root thereof is reduced, which is unfavorable from the viewpoint of strength and durability.

SUMMARY OF THE INVENTION

The present invention was made in consideration of the above circumstances, and an object thereof is to provide a transmission capable of suppressing degree of deformation of a counter shaft and a drive shaft and improving durability by ensuring a sufficient thickness at a root portion of a jaw clutch.

The above object can be achieved according to the present invention by providing a transmission for transmitting a motive power of an engine, the transmission including: a counter shaft that receives a motive power from a crank shaft of an engine; a drive shaft that is connected to the crank shaft and configured to output the motive power; a multi-stage gear train that has a plurality of unit gear trains each having a drive gear provided on the counter shaft and a driven gear provided on the drive shaft and always engaged with the drive gear; a plurality of jaw clutches each of which is movably provided between adjacent ones of the unit gear trains to connect motive power transmission from the counter shaft to the drive shaft by either one of the unit gear trains or disconnect transmission of the motive power by both the unit gear trains; a plurality of shift forks each of which is coupled to a corresponding one of the plurality of jaw clutches; and a shift cam that moves the plurality of jaw clutches via the plurality of shift forks to select one unit gear train in the multi-stage gear train that is to be used to transmit the motive power from the counter shaft to the drive shaft, wherein the unit gear trains in the multi-stage gear train have higher gear ratios of the unit gear trains are on a side closer to a center in a direction of rotation center lines of the counter shaft and the drive shaft.

In the transmission of the structure mentioned above, it may be desired that a gear ratio difference between the unit gear trains adjacent to each other with the jaw clutch interposed therebetween is two steps or less.

It may be also desired that, in a case where the unit gear trains is of an odd number, one of the plurality of jaw clutches connects or disconnects power transmission by a unit gear train only with a lowest gear ratio.

According to the transmission of the present invention described above, a deformation of a counter shaft and a drive shaft can be reduced and durability of parts and hence an engine, can be improved by providing a section of a jaw clutch that supports a jaw at a root thereof with a sufficient thickness.

The nature and further characteristic features and advantageous effects will be made clearer from the following descriptions with reference to the accompanying drawings.

DESCRIPTION OF THE PREFERRED EMBODIMENT

In the following, a transmission according to an embodiment of the present invention will be described with reference to FIGS. 1 to 5. It is further to be noted that terms "right", "left", "upper", "lower" and the like terms indicating direction are used herein with reference to the illustration of the drawings.

Figure 1:
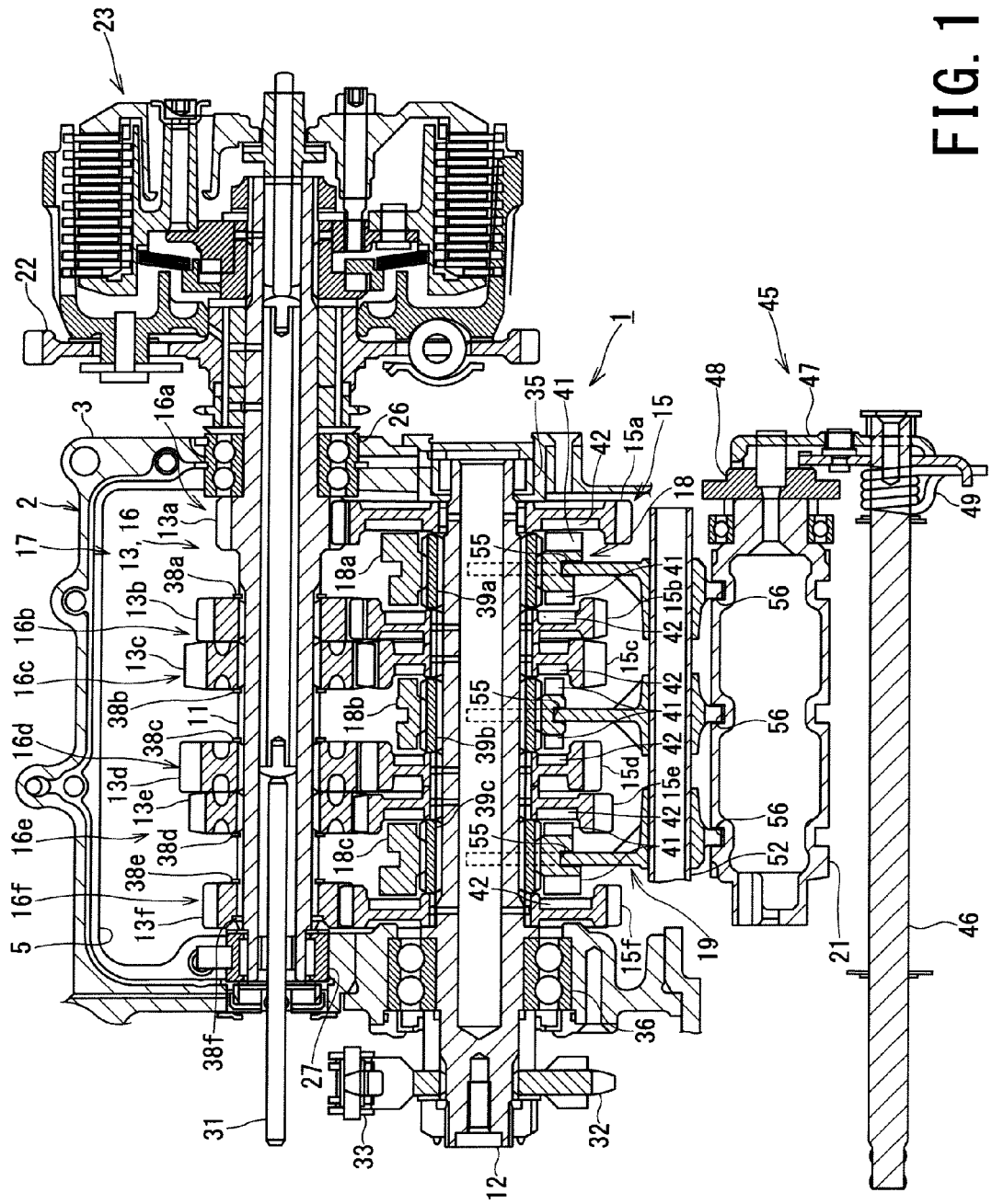
FIG. 1 is a cross-sectional view of a transmission according to an embodiment of the present invention.

As shown in FIG. 1 being a cross-sectional view of a transmission particularly for transmitting a motive power of an engine according to an embodiment of the present invention, a transmission 1 of the present embodiment is housed in a transmission case 3, which is integrated with a crank case, not shown, of an engine 2, for example, of a vehicle.

The engine 2 includes a crank shaft, not shown, housed and rotatably supported in the crank case, and a primary drive gear, not shown, capable of rotating integrally with the crank shaft.

The transmission 1 is housed in a transmission chamber 5 in the transmission case 3. The transmission 1 is a so-called jaw clutch transmission, which comprises: a counter shaft 11 that receives a power (motive power) from the crank shaft of the engine 2; a drive shaft 12 that outputs the motive power to a driving wheel, not shown; a multi-stage gear train 17 that has a plurality of unit gear trains 16 each having a drive gear 13 mounted on the counter shaft 11 and a driven gear 15 that is mounted on the drive shaft 12 so as to be always engaged with the drive gear 13; a plurality of jaw clutches 18 each of which is movably provided between adjacent ones of the unit gear trains 16 so as to connect the motive power transmission from the counter shaft 11 to the drive shaft 12 by either one of the unit gear trains 16 or disconnect the motive power transmission by both the unit gear trains 16; a plurality of shift forks 19 each of which is coupled to a corresponding one of the plurality of jaw clutches 18; and a shift cam 21 that moves the plurality of jaw clutches 18 via the plurality of shift forks 19 so as to select one unit gear train 16 in the multi-stage gear train 17 that is to be used to transmit the motive power from the counter shaft 11 to the drive shaft 12.

The counter shaft 11 is rotatably supported by the transmission case 3. At an end of the counter shaft 11 on one side in the drawing (the right-side end, in this example), a primary driven gear 22 always engaged with the primary drive gear and a clutch mechanism 23 are provided.

The primary driven gear 22 is rotatably supported on the counter shaft 11. The clutch mechanism 23 acts to switch the counter shaft 11 and the primary driven gear 22 so as to be rotated integrally or independently, thereby connecting or disconnecting the motive power transmission between the counter shaft 11 and the primary drive gear.

The counter shaft 11 is supported by bearings 26 and 27 in the transmission case 3 at a point closer to the center than the primary driven gear 22 and the clutch mechanism 23 and at an end of the counter shaft 11 on another side in the drawing (left-side end, in this embodiment).

The counter shaft 11 is a hollow shaft, and a clutch push rod 31 that activates the clutch mechanism 23 is disposed in the hollow space along the rotation center line of the counter shaft 11. The clutch push rod 31 is connected to a clutch lever, not shown.

The drive shaft 12 is disposed substantially in parallel with the counter shaft 11 and rotatably supported in the transmission case 3. A driving sprocket 32 is provided at an end of the drive shaft 12 on the other side of the drawing (left-side end, in the present embodiment). The driving sprocket 32 is fixed to the drive shaft 12 and rotates integrally with the drive shaft 12. A driving chain 33, which transmits the motive power to a driven sprocket, not shown, provided on the driving wheel, is wound up around the driving sprocket 32.

The drive shaft 12 is supported by bearings 35 and 36 in the transmission case 3 at a point closer to the center than the driving sprocket 32 and at an end of the drive shaft 12 on the one side in the drawing (right-side end, in the present embodiment).

The plurality of drive gears 13 are disposed between the two bearings 26 and 27. Each of the drive gears 13 is fixed to the counter shaft 11 and rotates integrally with the counter shaft 11.

The plurality of drive gears 13 comprise, as viewed from the side of the primary driven gear 22: a counter shaft first gear 13a; a counter shaft third gear 13b; a counter shaft fifth gear 13c; a counter shaft sixth gear 13d; a counter shaft fourth gear 13e; and a counter shaft second gear 13f (referred to simply as a first gear 13a, a third gear 13b, a fifth gear 13c, a sixth gear 13d, a fourth gear 13e and a second gear 13f, hereinafter). The higher the gear ratio, the larger the outer diameter of the drive gear 13 is, that is, in which the first gear 13a with the lowest gear ratio has the smallest outer diameter, and the sixth gear 13d with the highest gear ratio has the largest outer diameter (the same holds true for the pitch circle).

The first gear 13a is molded integrally with the counter shaft 11. The third gear 13b, which is disposed at a distance from the first gear 13a, is spline-coupled to the counter shaft 11 and fixed at a distance from the first gear 13a by means of a circlip 38a mounted on the counter shaft 11.

The fifth gear 13c is spline-coupled to the counter shaft 11 and fixed adjacent to the third gear 13b by means of a circlip 38b mounted on the counter shaft 11.

The sixth gear 13d, which is disposed at a distance from the fifth gear 13c, is spline-coupled to the counter shaft 11 and fixed at a distance from the fifth gear 13c by means of a circlip 38c mounted on the counter shaft 11.

The fourth gear 13e is spline-coupled to the counter shaft 11 and fixed adjacent to the sixth gear 13d by means of a circlip 38d mounted on the counter shaft 11.

The second gear 13f, which is disposed at a distance from the fourth gear 13e, is spline-coupled to the counter shaft 11 and fixed between circlips 38e and 38f mounted on the counter shaft 11 at a distance from the fourth gear 13e.

The plurality of driven gears 15 are disposed between the two bearings 35 and 36, each of which is rotatably supported on the drive shaft 12. The plurality of driven gears 15 comprise: a drive shaft first gear 15a always engaged with the first gear 13a; a drive shaft third gear 15b always engaged with the third gear 13b; a drive shaft fifth gear 15c always engaged with the fifth gear 13c; a drive shaft sixth gear 15d always engaged with the sixth gear 13d; a drive shaft fourth gear 15*e* always engaged with the fourth gear 13*e*; and a drive shaft second gear 15*f* always engaged with the second gear 13*f* (referred to simply as a first gear 15*a*, a third gear 15*b*, a fifth gear 15*c*, a sixth gear 15*d*, a fourth gear 15*e* and a second gear 15*f*, hereinafter).

The higher the gear ratio, the smaller the outer diameter of the driven gear 15 is; that is, in which the first gear 15*a* with the lowest gear ratio has the largest outer diameter, and the sixth gear 15*d* with the highest gear ratio has the smallest outer diameter (the same holds true for the pitch circle).

All of the plurality of driven gears 15 are rotatably supported on the drive shaft 12. A ring-shaped spacer 39*a* is spline-coupled to the drive shaft 12 between the first gear 15*a* and the third gear 15*b*. A ring-shaped spacer 39*b* is spline-coupled to the drive shaft 12 between the fifth gear 15*c* and the sixth gear 15*d*. A ring-shaped spacer 39*c* is spline-coupled to the drive shaft 12 between the fourth gear 15*e* and the second gear 15*f*. The third gear 15*b* is adjacent to the fifth gear 15*c*. The sixth gear 15*d* is adjacent to the fourth gear 15*e*.

The unit gear trains 16 include: a first unit gear train 16*a* composed of the first gear 13*a* and the first gear 15*a*; a third unit gear train 16*b* composed of the third gear 13*b* and the third gear 15*b*; a fifth unit gear train 16*c* composed of the fifth gear 13*c* and the fifth gear 15*c*; a sixth unit gear train 16*d* composed of the sixth gear 13*d* and the sixth gear 15*d*; a fourth unit gear train 16*e* composed of the fourth gear 13*e* and the fourth gear 15*e*; and a second unit gear train 16*f* composed of the second gear 13*f* and the second gear 15*f*.

The unit gear trains 16 have different gear ratios. More specifically, the first unit gear train 16*a* has the lowest gear ratio, the second unit gear train 16*f* has a higher gear ratio than the first unit gear train 16*a*, the third unit gear train 16*b* has a higher gear ratio than the second unit gear train 16*f*, the fourth unit gear train 16*e* has a higher gear ratio than the third unit gear train 16*f*, the fifth unit gear train 16*c* has a higher gear ratio than the fourth unit gear train 16*e*, and the sixth unit gear train 16*d* has the highest gear ratio. That is, the transmission 1 is a six-stage-type transmission that transmits the motive power of the engine 2 from the counter shaft 11 to the drive shaft 12 and changes speed by selecting one of the unit gear trains 16*a* from the first unit gear train 16*a* to the sixth unit gear train 16*d*.

The unit gear trains 16 in the multi-stage gear train 17 have higher gear ratios as they are closer to the center in a direction of the rotation center lines of the counter shaft 11 and the drive shaft 12. More specifically, the multi-stage gear train 17 comprises two sets of unit gear trains 16, that is, one set including the first unit gear train 16*a*, the third unit gear train 16*b* and the fifth unit gear train 16*c*, which have gear ratios that increase in two-step increments as they come closer to the center of the counter shaft 11 from the end of the counter shaft 11 on the one side of the drawing (right-side end, in this embodiment), and another set including the second unit gear train 16*f*, the fourth unit gear train 16*e* and the sixth unit gear train 16*d*, which have gear ratios that increase in two-step increments as they come closer to the center of the counter shaft 11 from the end of the counter shaft 11 on the another end of the drawing (left-side end, in this embodiment). It is noted that, herein, the term "center" of the counter shaft 11 and the drive shaft 12 refers to the center of a section of the counter shaft 11 between the bearings 26 and 27, and the term "center" of the drive shaft 12 refers to the center of a section of the drive shaft 12 between the bearings 35 and 36.

There are spaces between the first unit gear train 16*a* and the third unit gear train 16*b*, between the fifth unit gear train 16*c* and the sixth unit gear train 16*d* and between the fourth unit gear train 16*e* and the second unit gear train 16*f*, and the jaw clutches 18 are disposed in the spaces. The third unit gear train 16*b* and the fifth unit gear train 16*c* are adjacent to each other, and the sixth unit gear train 16*d* and the fourth unit gear train 16*e* are also adjacent to each other.

The plurality of jaw clutches 18 are spline-coupled to the spacers 39*a*, 39*b* and 39*c* on the drive shaft 12 and supported so as to be slidable in the direction of the rotation center line of the drive shaft 12. The plurality of jaw clutches 18 comprise a jaw clutch 18*a* disposed between the first unit gear train 16*a* and the third unit gear train 16*b*, a jaw clutch 18*b* disposed between the fifth unit gear train 16*c* and the sixth unit gear train 16*d*, and a jaw clutch 18*c* disposed between the fourth unit gear train 16*e* and the second unit gear train 16*f*. In other words, the jaw clutch 18*a* is disposed between the first gear 15*a* and the third gear 15*b*, the jaw clutch 18*b* is disposed between the fifth gear 15*c* and the sixth gear 15*d*, and the jaw clutch 18*c* is disposed between the fourth gear 15*e* and the second gear 15*f*. Thus, there is a two-step gear ratio difference between unit gear trains 16 adjacent to each other with the jaw clutch 18 interposed therebetween.

The plurality of jaw clutches 18 couple the first gear 15*a*, the third gear 15*b*, the fifth gear 15*c*, the sixth gear 15*d*, the fourth gear 15*e* and the second gear 15*f* to the drive shaft 12 so as to rotate the gears integrally with the drive shaft 12. Each of the plurality of jaw clutches 18 has clutch-side protrusions or recesses 41 that face side surfaces of the driven gears 15 on both the sides, and each of the plurality of driven gears 15 has gear-side recesses or protrusions 42 on the side surfaces thereof that are to be engaged with the clutch-side protrusions or recesses 41.

Each of the plurality of jaw clutches 18 makes either of the driven gears 15 on both the sides rotate integrally with the drive shaft 12 by one of the protrusions or recesses 41 thereof by being engaged with or disengaged from the corresponding recess or protrusion 42 on the driven gear 15.

More specifically, the jaw clutch 18*a* slides on the rotation center line of the drive shaft 12 in the direction toward the first gear 15*a* so as to engage the protrusion or recess 41 on the jaw clutch 18*a* with the recess or protrusion 42 on the first gear 15*a* to make the first gear 15*a* rotate integrally with the drive shaft 12, thereby transmitting the power by the first unit gear train 16*a*.

The jaw clutch 18*a* slides on the rotation center line of the drive shaft 12 in the direction toward the third gear 15*b* so as to engage the protrusion or recess 41 on the jaw clutch 18*a* with the recess or protrusion 42 on the third gear 15*b* to make the third gear 15*b* rotate integrally with the drive shaft 12, thereby transmitting the power by the third unit gear train 16*b*.

The jaw clutch 18*b* slides on the rotation center line of the drive shaft 12 in the direction toward the fifth gear 15*c* so as to engage the protrusion or recess 41 on the jaw clutch 18*b* with the recess or protrusion 42 on the fifth gear 15*c* to make the fifth gear 15*c* rotate integrally with the drive shaft 12, thereby transmitting the power by the fifth unit gear train 16*c*.

The jaw clutch 18*b* slides on the rotation center line of the drive shaft 12 in the direction toward the sixth gear 15*d* so as to engage the protrusion or recess 41 on the jaw clutch 18*b* with the recess or protrusion 42 on the sixth gear 15*d* to make the sixth gear 15*d* rotate integrally with the drive shaft 12, thereby transmitting the power by the sixth unit gear train 16*d*.

The jaw clutch 18c slides on the rotation center line of the drive shaft 12 in the direction toward the fourth gear 15e so as to engage the protrusion or recess 41 on the jaw clutch 18c with the recess or protrusion 42 on the fourth gear 15e to make the fourth gear 15e rotate integrally with the drive shaft 12, thereby transmitting the power by the fourth unit gear train 16e.

The jaw clutch 18c slides on the rotation center line of the drive shaft 12 in the direction toward the second gear 15f so as to engage the protrusion or recess 41 on the jaw clutch 18c with the recess or protrusion 42 on the second gear 15f to make the second gear 15f rotate integrally with the drive shaft 12, thereby transmitting the power by the second unit gear train 16f.

The jaw clutch 18 disconnects the power transmission by the unit gear trains 16 on both the sides at a time when the clutch-side protrusions or recesses 41 thereof are separated from the driven gears 15 on both the sides.

The shift forks 19 and the shift cam 21 are part of a shift device 45. The shift device 45 comprises a shift shaft 46 coupled to a shift pedal, not shown, by a link mechanism, not shown, a gear shift cam driving plate 47 that is swung by the rotation of the shift shaft 46 upon a shift operation, a gear shift cam stopper plate 48 that converts the swing motion of the gear shift cam driving plate 47 to a rotational motion of the shift cam 21, a shift return spring 49 that restores the shift pedal into a neutral position, and a shift fork shaft 52 that supports the shift forks 19 slidably in the direction of the rotation center line of the drive shaft 12.

The plurality of shift forks 19 extend from the shift cam 21 to the jaw clutch 18a, 18b and 18c on the drive shaft 12 and are fitted into shift fork grooves 55 in the jaw clutches 18a, 18b and 18c.

The shift cam 21 has a cylindrical shape and has a plurality of cam grooves 56 formed in an outer peripheral surface thereof. The shift fork 19 is fitted into each of the cam grooves 56. When the shift pedal is operated, the shift cam 21 rotates via the shift shaft 46, the gear shift cam driving plate 47 and the gear shift cam stopper plate 48. The rotation of the shift cam 21 is transmitted to the shift forks 19 on the shift fork shaft 52 through the cam grooves 56 to thereby move the shift forks 19 appropriately in the direction of the rotation center line of the drive shaft 12, thereby engaging one of the jaw clutches 18a, 18b and 18c with one of the plurality of driven gears 15 so as to select one of the unit gear trains 16 for the power transmission or disengaging all the jaw clutches 18a, 18b and 18c from all of the plurality of driven gears 15 to disconnect the power transmission by all of the unit gear trains 16.

Figure 2:
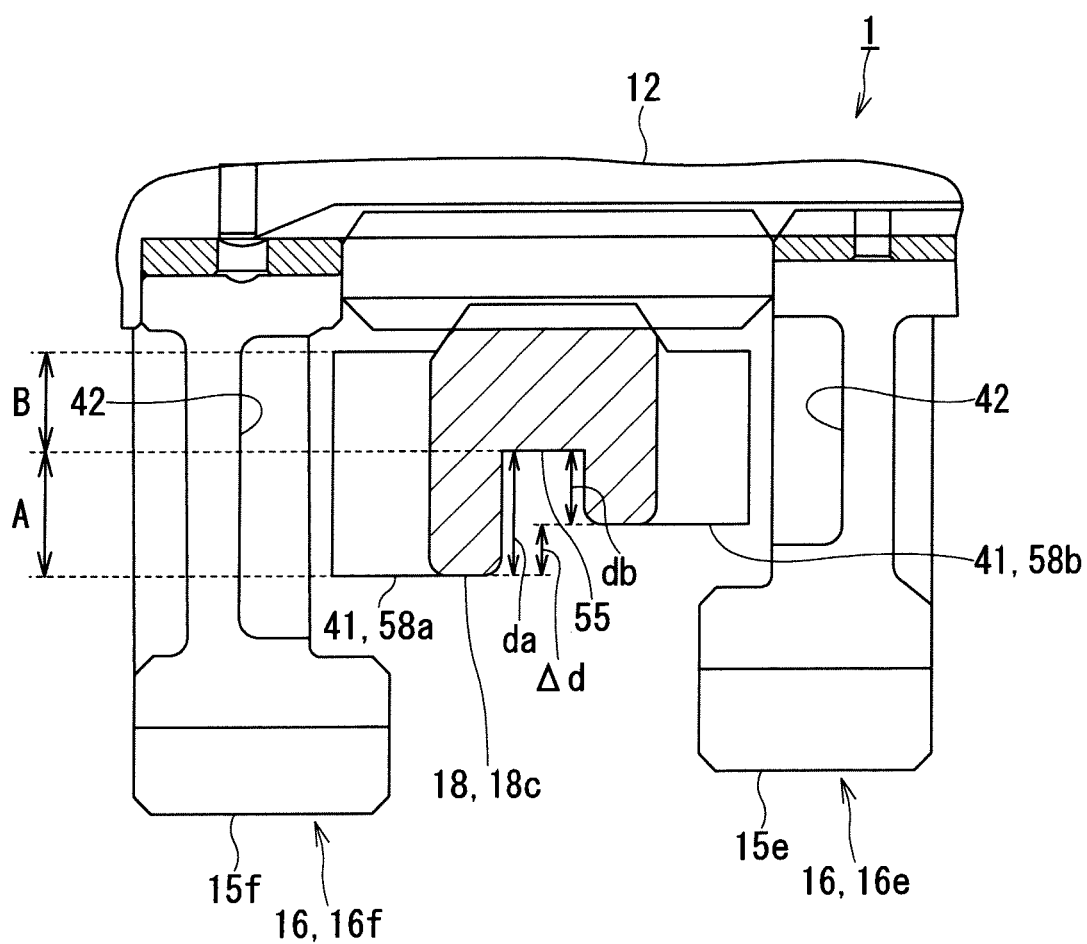
FIG. 2 is an enlarged cross-sectional view of essential parts of the transmission according to the embodiment of the present invention.
Figure 3:
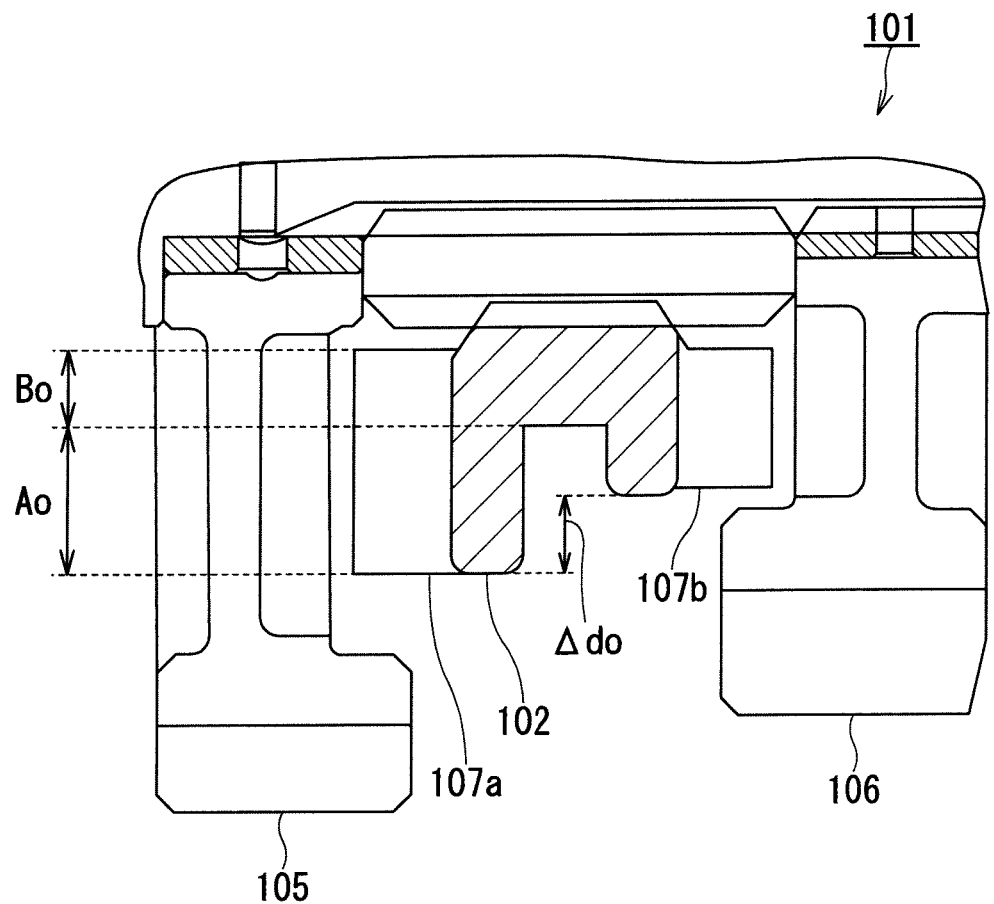
FIG. 3 is an enlarged cross-sectional view showing a conventional transmission as a comparative example.

FIG. 2 is an enlarged cross-sectional view of essential parts of the transmission according to this embodiment of the present invention, and FIG. 3 is an enlarged cross-sectional view showing a conventional transmission as a comparative example.

FIGS. 2 and 3 are diagrams for illustrating differences in a jaw clutch disposed between the second gear and a gear adjacent to the second gear (the fourth gear 15e in the transmission 1 according to the present embodiment or the fifth gear in the conventional transmission).

First, as shown in FIG. 2, in the transmission 1 according to the present embodiment, there is a two-step gear ratio difference between the unit gear trains 16 adjacent to each other with the jaw clutch 18 interposed therebetween. More specifically, the jaw clutch 18c is disposed between the second gear 15f and the fourth gear 15e. Compared with the fourth gear 15e with the higher gear ratio, the second gear 15f with the lower gear ratio has a larger outer diameter and is subjected to a higher load during the motive power transmission. Therefore, the jaw clutch 18c has a clutch-side protrusion or recess 41 having a larger outer diameter on the side of the second gear 15f and a clutch-side protrusion or recess 41 having a smaller outer diameter on the side of the fourth gear 15e. The larger clutch-side protrusion or recess 41 on the side of the second gear 15f is referred to as a large diameter jaw 58a, and the smaller clutch-side protrusion or recess 41 on the side of the fourth gear 15e is referred to as a small diameter jaw 58b.

The shift fork groove 55 in the jaw clutch 18 is disposed between the large diameter jaw 58a and the small diameter jaw 58b, so that there is a difference $\Delta d$ between a groove depth da on the side of the large diameter jaw 58a and a groove depth db on the side of the small diameter jaw 58b, which is due to the difference in diameter between the large diameter jaw 58a and the small diameter jaw 58b. The shallower groove depth db on the side of the small diameter jaw 58b has to provide a contact area with the shift fork 19 enough to allow the jaw clutch 18 to slide. The groove depth da on the side of the large diameter jaw 58a is larger than the groove depth db on the side of the small diameter jaw 58b by the difference $\Delta d$. According to the groove depth da on the back side of the large diameter jaw 58a, the jaw clutch 18 has a thicker portion B and a thinner portion A at the root of the large diameter jaw 58a to which the larger load is applied.

On the other hand, as shown in FIG. 3, in a conventional transmission 101, there is a three-step gear ratio difference between unit gear trains 103 adjacent to each other with a jaw clutch 102 interposed therebetween. More specifically, the jaw clutch 102 is disposed between a second gear 105 and a fifth gear 106. Since there is a three-step gear ratio difference between a large diameter jaw 107a and a small diameter jaw 107b, the conventional transmission 101 has an increased difference in outer diameter between the large diameter jaw 107a and the small diameter jaw 107b and therefore an increased difference in groove depth $\Delta$do.

The jaw clutch 102 has a thicker portion Bo and a thinner portion Ao that support the large diameter jaw 107a, and the increase in difference in groove depth $\Delta$do results in an enlargement of the thinner portion Ao, that is, an increase of the length of the thinner portion Ao that extends outwardly from the portion Bo.

As can be seen from comparison between FIGS. 2 and 3, the conventional transmission 101 has a large gear ratio difference of three steps between the unit gear trains 103 adjacent to each other with the jaw clutch 102 interposed therebetween, a large difference in diameter between the large diameter jaw 107a and the small diameter jaw 107b, and therefore a large groove depth difference $\Delta$do and a relatively large thinner portion Ao at the root of the large diameter jaw 107a.

With the transmission 1 according to the present invention, however, the gear ratio difference between the unit gear trains 16 adjacent to each other with the jaw clutch 18 interposed therebetween is reduced to two steps, thereby reducing the difference in diameter between the large diameter jaw 58a and the small diameter jaw 58b, the groove depth difference $\Delta d$, and the size of the thinner portion A at the root of the large diameter jaw 58a, thereby increasing the proportion of the thicker portion B to reduce a stress that occurs in the jaw clutch 18.

Next, other examples of the transmission 1 according to the present embodiment will be described. The same components of transmissions 1A and 1B described in the examples as those of the transmission 1 are denoted by the same reference numerals, and redundant descriptions will be omitted.

Figure 4:
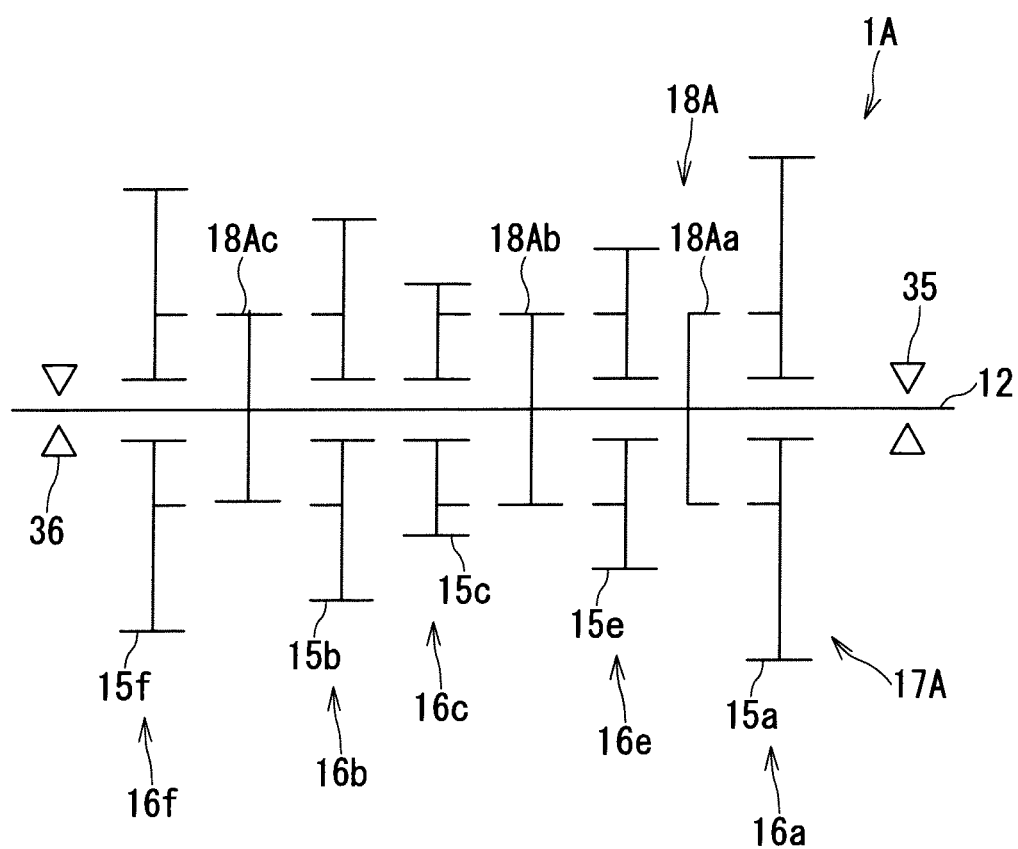
FIG. 4 is a schematic diagram showing another example of the transmission according to the embodiment of the present invention.

FIG. 4 is a schematic diagram showing another example of the transmission according to the embodiment of the present invention.

As shown in FIG. 4, the transmission 1A according to this example (embodiment) differs from the transmission 1 having an even number of stages of unit gear trains 16 in that the transmission 1A has a multi-stage gear train 17A including an odd number of stages of unit gear trains 16. The transmission 1A is a five-stage transmission that transmits the motive power of the engine 2 from the counter shaft 11 to the drive shaft 12 and changes speed by selecting one of the unit gear trains 16a from the first unit gear train 16a to the fifth unit gear train 16c.

As like as the multi-stage gear train 17, the unit gear trains 16 in the multi-stage gear train 17A have higher gear ratios as they are closer to the center in the direction of the rotation center lines of the counter shaft 11 and the drive shaft 12.

More specifically, the multi-stage gear train 17A comprises two sets of unit gear trains 16, i.e., one set including the first unit gear train 16a, the fourth unit gear train 16e and the fifth unit gear train 16c, which have gear ratios that increase as they come closer to the center of the counter shaft 11 from the end of the counter shaft 11 on the one side of the drawing (right-side end, in this example), and another set including the second unit gear train 16f and the third unit gear train 16b, which have gear ratios that increase as they come closer to the center of the counter shaft 11 from the end of the counter shaft 11 on the another end of the drawing (left-side end, in this example).

A plurality of jaw clutches 18A comprise a jaw clutch 18Aa disposed between the first unit gear train 16a and the fourth unit gear train 16e, a jaw clutch 18Ab disposed between the fourth unit gear train 16e and the fifth unit gear train 16c, and a jaw clutch 18Ac disposed between the third unit gear train 16b and the second unit gear train 16f. In other words, the jaw clutch 18Aa is disposed between the first gear 15a and the fourth gear 15e, the jaw clutch 18Ab is disposed between the fourth gear 15e and the fifth gear 15c, and the jaw clutch 18Ac is disposed between the third gear 15b and the second gear 15f.

The jaw clutch 18Aa is a one-sided jaw that couples only the first gear 15a to the drive shaft 12 to make the first gear 15a rotate integrally with the drive shaft 12. That is, in the case where there is an odd number of unit gear trains 16, one jaw clutch 18Aa of the plurality of jaw clutches 18A connects or disconnects only power transmission by the unit gear train 16 having the lowest gear ratio.

The jaw clutch 18Ab couples the fourth gear 15e or the fifth gear 15c to the drive shaft 12 to make the gear rotate integrally with the drive shaft 12. The jaw clutch 18Ac couples the third gear 15b or the second gear 15f to the drive shaft 12 to make the gear rotate integrally with the drive shaft 12. That is, each of the jaw clutches 18Ab and 18Ac rotates one of the driven gears 15 on both the sides integrally with the drive shaft 12. There is a one-step gear ratio difference between the unit gear trains 16 adjacent to each other with the jaw clutch 18Ab, 18Ac interposed therebetween.

With the transmission 1A according to the embodiment present invention described above, the gear ratio difference between the unit gear trains 16 adjacent to each other with the jaw clutch 18Ab, 18Ac interposed therebetween is reduced to one step, thereby further reducing the difference in diameter between the large diameter jaw 58a and the small diameter jaw 58b, the groove depth difference Δd, and the size of the thinner portion A at the root of the large diameter jaw 58a, thereby increasing the proportion of the thicker portion B to substantially reduce a stress that occurs in the jaw clutch 18.

Figure 5:
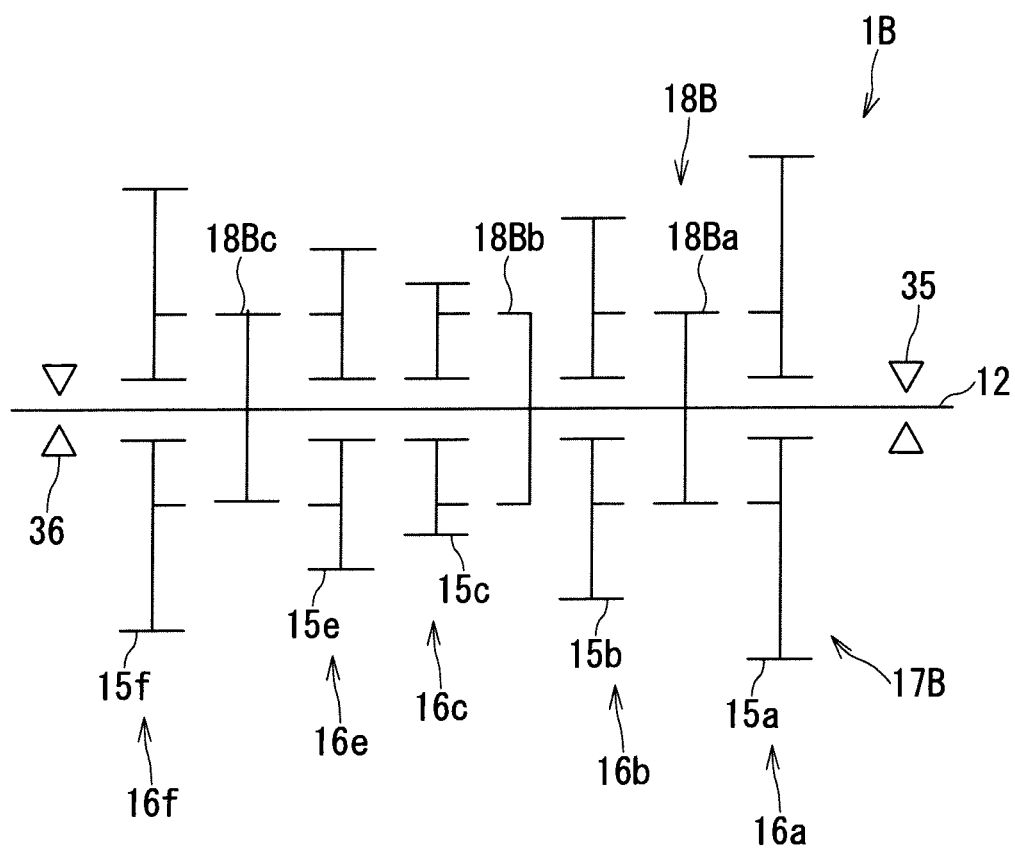
FIG. 5 is a schematic diagram showing another example of the transmission according to the embodiment of the present invention.

FIG. 5 is a schematic diagram showing another example of the transmission according to the embodiment of the present invention.

As shown in FIG. 5, as with the transmission 1A, the transmission 1B according to this example of the embodiment has a multi-stage gear train 17B including an odd number of stages of unit gear trains 16.

As like as the multi-stage gear train 17, the unit gear trains 16 in the multi-stage gear train 17B have higher gear ratios as they are closer to the center in the direction of the rotation center lines of the counter shaft 11 and the drive shaft 12.

More specifically, the multi-stage gear train 17B comprises two sets of unit gear trains 16, i.e., one set including the first unit gear train 16a, the third unit gear train 16b and the fifth unit gear train 16c, which have gear ratios that increase in two-step increments as they come closer to the center of the counter shaft 11 from the end of the counter shaft 11 on the one side of the drawing (right-side end, in this example), and another set including the second unit gear train 16f and the fourth unit gear train 16e, which have gear ratios that increase in two-step increments as they come closer to the center of the counter shaft 11 from the end of the counter shaft 11 on the another end of the drawing (left-side end, in this example).

A plurality of jaw clutches 18B comprise a jaw clutch 18Ba disposed between the first unit gear train 16a and the third unit gear train 16b, a jaw clutch 18Bb disposed between the third unit gear train 16b and the fifth unit gear train 16c, and a jaw clutch 18Bc disposed between the fourth unit gear train 16e and the second unit gear train 16f. In other words, the jaw clutch 18Ba is disposed between the first gear 15a and the third gear 15b, the jaw clutch 18Bb is disposed between the third gear 15b and the fifth gear 15c, and the jaw clutch 18Bc is disposed between the fourth gear 15e and the second gear 15f.

The jaw clutch 18Bb is a one-sided jaw that couples only the fifth gear 15c to the drive shaft 12 to make the fifth gear 15c rotate integrally with the drive shaft 12.

The jaw clutch 18Ba couples the first gear 15a or the third gear 15b to the drive shaft 12 to make the gear rotate integrally with the drive shaft 12. The jaw clutch 18Bc couples the fourth gear 15e or the second gear 15f to the drive shaft 12 to make the gear rotate integrally with the drive shaft 12. That is, the jaw clutches 18Ba and 18Bc each make one of the driven gears 15 on both the sides rotate integrally with the drive shaft 12. There is a two-step gear ratio difference between the unit gear trains 16 adjacent to each other with the jaw clutch 18Ba, 18Bc interposed therebetween.

With the transmission 1B according to the present invention, the gear ratio difference between the unit gear trains 16 adjacent to each other with the jaw clutch 18Ba, 18Bc interposed therebetween is reduced to two steps, thereby reducing the difference in diameter between the large diameter jaw 58a and the small diameter jaw 58b, the groove depth difference Δd, and the size of the thinner portion A at the root of the large diameter jaw 58a, thereby increasing the proportion of the thicker portion B to reduce a stress that occurs in the jaw clutch 18.

The transmissions 1, 1A and 1B according to the described embodiment configured as described above have the multi-stage gear train 17 that includes unit gear trains 16 having higher gear ratios as they are closer to the center in the direction of the rotation center lines of the counter shaft 11 and the drive shaft 12. Thus, unit gear trains 16 with higher gear ratios, specifically, the fifth unit gear train 16c and the sixth unit gear train 16d, are disposed in the center sections of the counter shaft 11 and the drive shaft 12. As a result, the load applied to the counter shaft 11 and the drive shaft 12 during the motive power transmission is reduced to reduce the deformation thereof, thereby improving the durability of the shafts.

Furthermore, with the transmissions 1, 1A and 1B according to the described embodiments, the gear ratio difference between the unit gear trains 16 adjacent to each other with the jaw clutch 18, 18A, 18B interposed therebetween is reduced to two steps or less, thereby providing the section of the jaw clutch that supports the jaw at the root thereof with a sufficient thickness and reducing a stress that occurs in the jaw clutch 18, 18A, 18B.

Furthermore, with the transmission 1A according to the described embodiments, one jaw clutch 18Aa of the plurality of jaw clutches 18A is dedicated only to the unit gear train 16 with the lowest gear ratio, thereby reducing the gear ratio difference between the unit gear trains 16 adjacent to each other with the remaining jaw clutch 18Ab, 18Ac interposed therebetween to one step and further reducing the stress that occurs in the jaw clutch 18A.

Therefore, with the transmissions 1, 1A and 1B according to the described embodiments, the deformation of the counter shaft 11 and the drive shaft 12 can be reduced, and the section of the jaw clutch that supports the jaw at the root thereof can be provided with a sufficient thickness and an improved durability.

It is further to be noted that the present invention is not limited to the described embodiments and many other changes and modifications or alternations may be made without departing the scope of the appended claims.

What is claimed is:

1. A transmission for transmitting a motive power of an engine, the transmission comprising:
 a counter shaft that receives a motive power from a crank shaft of the engine;
 a drive shaft that is connected to the engine crank shaft and configured to output the motive power;
 a multi-stage gear train that has a plurality of unit gear trains each having both a drive gear provided on the counter shaft and a driven gear provided on the drive shaft, wherein the driven gear and the drive gear are always engaged with one another;
 a plurality of jaw clutches each of which being supported by the drive shaft and being movably provided between adjacent unit gear trains to connect motive power transmission from the counter shaft to the drive shaft by either of the adjacent unit gear trains or to disconnect transmission of the motive power by both the unit gear trains;
 a plurality of shift forks each of which being coupled to a corresponding one of the plurality of jaw clutches; and
 a shift cam that moves the plurality of jaw clutches via the plurality of shift forks to select one unit gear train in the multi-stage gear train that is to be used to transmit the motive power from the counter shaft to the drive shaft,
 wherein the unit gear trains in the multi-stage gear train having higher gear ratios of the unit gear trains are positioned on a side closer to a center in a direction of rotation center lines of the counter shaft and the drive shaft, and
 a gear ratio difference between the unit gear trains adjacent to each other, with the jaw clutch interposed therebetween, is two steps or less.

\* \* \* \* \*